(12) United States Patent
Haque et al.

(10) Patent No.: US 6,286,879 B1
(45) Date of Patent: Sep. 11, 2001

(54) I-SECTION AUTOMOTIVE BUMPER FORMED FROM MINERAL-FILLED GLASS MAT THERMOPLASTIC (GMT) COMPOSITE

(75) Inventors: Enamul Haque; Walt Bassett, both of Gastonia, NC (US); Thomas F. Lewis, Trumbull, CT (US)

(73) Assignee: Azdel, Inc., Shelby, NC (US)

( * ) Notice: Subject to any disclaimer, the term of this patent is extended or adjusted under 35 U.S.C. 154(b) by 0 days.

(21) Appl. No.: 09/511,574

(22) Filed: Feb. 23, 2000

Related U.S. Application Data (60) Provisional application No. 60/121,646, filed on Feb. 24, 1999.

(51) Int. Cl.[7] .................................................. B60R 19/02
(52) U.S. Cl. .......................... 293/120; 293/102; 293/132
(58) Field of Search ..................................... 293/120, 132, 293/102

(56) References Cited

U.S. PATENT DOCUMENTS

| | | | |
|---|---|---|---|
| 4,098,943 | * | 7/1978 | Degginger et al. .................. 428/283 |
| 5,269,574 | * | 12/1993 | Bhutani et al. ...................... 293/102 |
| 5,804,511 | * | 9/1998 | Kelman et al. ...................... 442/172 |
| 5,883,021 | * | 3/1999 | Beer et al. ............................ 442/172 |
| 5,910,458 | * | 6/1999 | Beer et al. ............................ 442/367 |
| 5,914,163 | * | 6/1999 | Browne ............................ 293/132 X |
| 5,985,429 | * | 6/1999 | Plummer et al. ..................... 428/220 |
| 6,099,055 | * | 8/2000 | Hirota et al. ......................... 293/120 |

* cited by examiner

Primary Examiner—Joseph D. Pape
(74) Attorney, Agent, or Firm—Dougherty & Clements LLP (57) ABSTRACT

The invention is a fiber reinforced thermoplastic automotive bumper wherein the reduced fiber additions consist of a long, chopped glass mat with the addition of mineral fillers such as mica, talc or clay. The modified thermoplastic is used to produce I-section bumpers. The improved reinforced thermoplastic material has favorable flow characteristics which enable the material to substantially fill the deep ribs and mounting stay structures used in I-section bumpers during compression molding while improving the modulus or cross-face stiffness of the finished part. For the first time, improved flow characteristics during molding permit the material to flow evenly into small ribs, bosses and other features. The invention makes it possible to increase part integration, molding pencil braces, fascia supports, mounting holes and mounting stays. The front surface of the bumper may be covered with a conformal energy absorber made of plastic foam. Moreover, the absorber serves to mount appearance fascia. The result is a cost-reduced, weight-reduced bumper with improved impact resistance.

6 Claims, 7 Drawing Sheets

I-SECTION AUTOMOTIVE BUMPER FORMED FROM MINERAL-FILLED GLASS MAT THERMOPLASTIC (GMT) COMPOSITE

CROSS REFERENCE TO RELATED APPLICATION

This application claims the benefit of U.S. Provisional Application No. 60/121,646, filed Feb. 24, 1999.

FIELD OF INVENTION

This invention relates generally to bumpers for automobiles and, more specifically, to an I-section bumper having improved impact performance and formed from mineral filled glass mat thermoplastic composites.

BACKGROUND OF THE INVENTION

By their nature, automobile bumpers must be able to withstand considerable impact. Metal or metal reinforced bumpers have heretofore been the only practical alternative for car makers because of the strength and durability associated with the metal components. Unfortunately, metal bumper components are expensive to produce, and add substantial weight to automobiles, decreasing fuel efficiency.

Car makers and automotive parts makers have experimented a great deal with plastic bumpers, seeking a cheaper and lighter weight substitute for the heavier traditional metal bumpers. Though appreciable progress has been made, plastic bumpers still have a strength to weight ratio that is unacceptable to the automotive industry. There are two aspects to the shortcomings of the plastic bumpers. First, the automotive industry has been unable to develop a plastic material that is economically viable with acceptable tensile and impact strength for bumper use. Second, the automotive industry has been unable a develop a plastic frame arrangement capable of withstanding impacts typically encountered in automobile accidents.

Currently, the most popular plastic materials used for automotive parts and bumpers are glass mat thermoplastics. Glass mat thermoplastic (GMT) composites are a family of compression-moldable, fiberglass-reinforced materials with thermoplastic matrices whose mechanical properties are generally higher than those of standard, injection-molded thermoplastic composites. GMT is available in the following glass-mat types: continuous-strand, randomly oriented glass-mat products which provide a good balance of stiffness and strength in all three axes; unidirectional long-glass-fiber mats which add directional stiffness and strength in a single axis; and, long, chopped fiber glass mats which provide improved flow properties and improvements in energy management with minimum decrease in stiffness.

The different glass mats are combined with a thermoplastic resin, usually polypropylene, (although other higher temperature engineering resins are also offered) to form a moldable product. GMT products are supplied in sheet or blank form to processors who shape the materials by compression molding or thermostamping.

Until recently, plastic bumpers have traditionally been manufactured with frame arrangements having a "C" or a "W" cross-section; the "C" or the "W" is used to describe the shape of the plastic cross-members connecting the front and rear plastic bumper walls. These configurations were chosen because of favorable energy absorption characteristics, especially when the bumper was impacted with a vertical component of force. I-section plastic bumper design has evolved over the past 10-years. Reinforced plastic bumpers have provided adequate performance and significant weight reduction but at a cost penalty. In 1992, the publication Plastic News speculated that "A new bumper design concept—the I-beam—offers the potential for making plastic bumper beams even lighter weight and cost competitive with steel bumpers up to volumes in excess of 100,000 per year."

U.S. Pat. No. 5,269,574, to Bhutani et al. discloses a bumper with an I-beam shape constructed of fiber reinforced thermoplastic or thermoset reinforcing resin. The fiber reinforcing the thermoplastic is selected from a group of unoxidizable steel fibers, aluminized glass fibers, cellulosic fibers or glass fibers. Unfortunately, implementation of the design disclosed by Bhutani et al. presents molding problems that are inconsistent with the economic constraints in the automobile industry. For example, the Bhutani et al. I-section bumper structure having ribbed sections fails to form adequately during molding. X-ray analysis shows that only 50 to 80% of the fibers used in the molding of the Bhutani et al. bumper flow into the ribs. The economic considerations require that mounting stays be integral to the structure.

SUMMARY OF INVENTION

The invention is an I-section bumper formed from fiber reinforced thermoplastic wherein the fiber additions consist of a long, chopped glass mat with the addition of mineral fillers such as mica, talc or clay. The use of mineral fillers allows for the replacement of more costly fibers. The invented reinforced thermoplastic material has favorable flow characteristics which enable the material to substantially fill the deep ribs and mounting stay structures used in I-section bumpers during compression molding while improving the modulus or cross-face stiffness of a finished part. For the first time, improved flow characteristics during molding permit the material to flow evenly into small ribs, bosses and other features. This makes it possible to increase part integration, molding pencil braces, fascia supports, mounting holes and mounting stays. The first surface is covered with a conformal energy absorber made of plastic foam. Moreover, the absorber serves to mount an appearance fascia. The result is a cost-reduced, weight-reduced bumper with improved impact resistance. The invented bumper is economical, light weight and exhibits superior performance in comparison with steel-based bumpers in safety and deformation resistance upon impact.

OBJECT OF THE INVENTION

The principal object of this invention is to provide an I-section bumper for automobiles that is formed from plastic material.

Another, more particular object of this invention is to provide a GMT bumper for automobiles that satisfies all relevant requirements for structural integrity under standardized impact tests, while significantly reducing manufacturing cost and part weight.

Another object of this invention is to provide a GMT bumper for automobiles that has favorable flow characteristics during compression molding of the bumper.

BRIEF DESCRIPTION OF THE DRAWINGS

The foregoing and other objects will become more readily apparent by referring to the following detailed description and the appended drawings in which.

DESCRIPTION OF PREFERRED EMBODIMENT

Glass mat thermoplastic (GMT) composites are a family of compression-moldable, fiberglass-reinforced materials with thermoplastic matrices whose mechanical properties are generally higher than those of injection-molded thermoplastic composites.

The current invention uses mineral filled GMT as the base material for forming an I-section bumper. Mineral filled and long chopped glass GMT products provide a significant weight reduction versus continuous-strand, randomly oriented glass-mat products, unidirectional long glass-fiber mats, and long dropped fiber glass mats while increasing stiffness. While most C- and W-section beams can be formed with any of the glass-mat material options, the higher flow required to fill ribs in reinforced I-section designs has in the past demanded the use of short-chopped fiber or short-glass and mineral products alone. Such chopped fiber mat products are less costly than their continuous-strand counterparts. As with all compression-molded GMT products, such products can be combined with other GMT mat products in the mold to address the needs of a given design.

Surprisingly, long chopped fiber material as used in accordance with the present invention, offers outstanding flow characteristics including the ability to flow into relatively small ribs, bosses and other features. Other tests have shown the ability of this material to provide uniform distribution of fiber even in wall thickness' less than 2 mm. These properties make it possible to increase part integration, including the use of mounting stays, pencil braces, fascia supports, and the like. The I-section discussed in greater detail herein may include integral mounting stays.

The I-Section bumper structure with its ribbed sections performs best when a homogeneous distribution of the glass/resin mix flows into the deep ribs. The present invention uses long, chopped structural GMT for improved flow of the glass fibers into all areas of the mold. This allows the I-beam rib design to reach its full potential in distributing the forces throughout the beam structure. The use of long, chopped structural GMT shows improvement over GMT formulations with random or unidirectional glass mats, GMT formulations with random or unidirectional glass mats demonstrated marginal performance in I-beam production where X-ray analysis showed that only 50 to 80% of the glass fibers were flowing into the ribs.

In contrast to using glass fibers alone, the formulation of long glass GMT that includes the substitution of mineral fillers, such as mica, talc or clay, improves the modulus while lowering cost. Mineral fillers may also be selected from the group consisting of kaolin, calcium carbonate, $TiO_2$, fummed & ppt silica, plastic fiber & spheres, ppt calcium carbonate, rice hulls and nut shells. The particle size of the fillers also improves the capacity of the reinforcements to fill the deep rib portions of the I-beam.

The use of long, chopped structural GMT allows the glass mat material in the thermoplastic composite to flow into the ribs of an I-beam structure more effectively, allowing distribution of impact forces throughout the bumper. The use of mineral fillers in the thermoplastic composite, while lowering glass fiber content, keeps the tensile and flexural properties of the bumper high, while achieving reasonable cost savings. Although the density of the invented composite rises slightly, the drop in cost of production offsets the rise in weight.

Surprisingly, the impact performance of the mineral-filled GMT products is significantly higher than similar non-filled GMT products. The long, chopped structural GMT I-beam or I-section bumpers with mineral fillers show improved strength over conventional bumpers including improved force resistance, minimized intrusion, and lower likelihood of failure upon high force impact.

Figure 1:
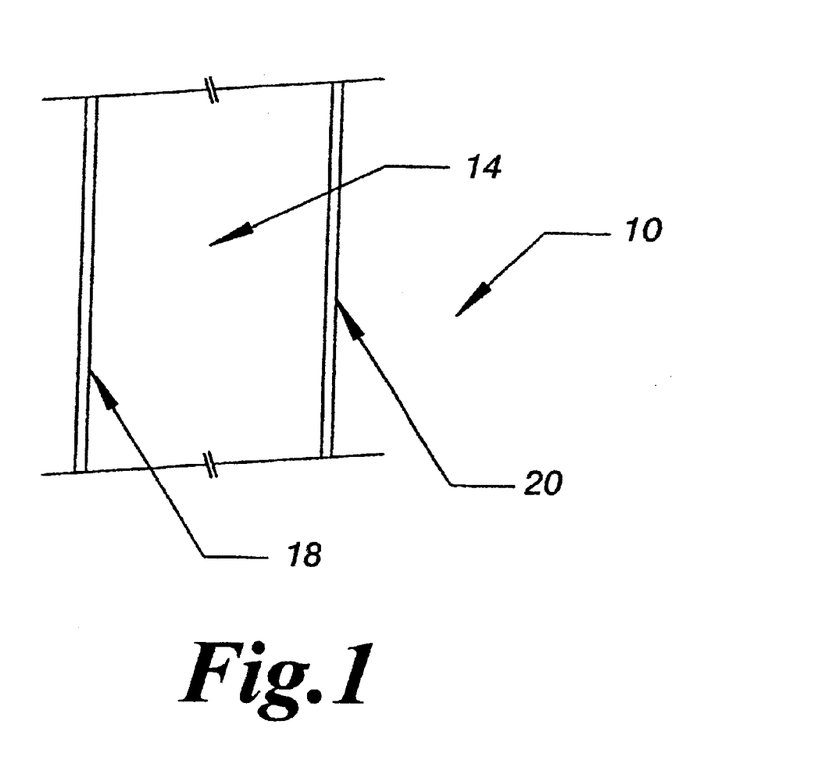
FIG. 1 is a top view of the I-beam portion of the invented bumper.
Figure 2:
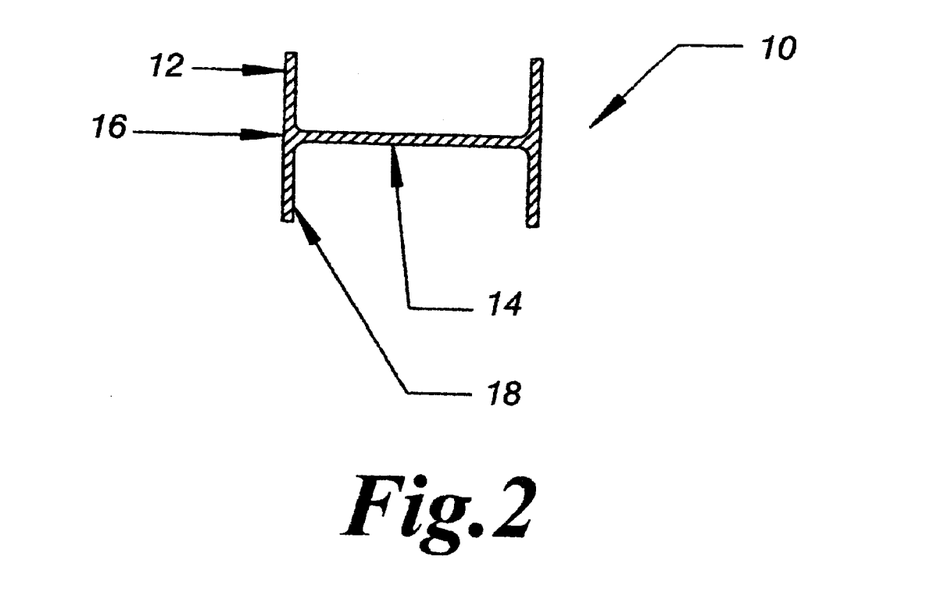
FIG. 2 is a cross section of the I-beam portion of the invented bumper.

FIG. 1 is a top view of the I-beam 10 portion of the invented bumper. The I-beam 10 includes a front flange 18 and a rear flange 20 that is connected by a web 14. The invented I-beam 10 is successful because material is removed in such a way that load bearing capacity is preserved but weight is dramatically reduced. The moments of inertia in the two principal directions may have a ratio as high as 15:1. FIG. 2 is a cross section of the I-beam 10 portion of the invented bumper. When the I-beam structure 10 is used as the bumper of an automobile, the load may be directed into the front flange 18 at a central portion 16 or an end portion 12. A barrier impact may be considered a centered impact.

The actual width and thicknesses of the front flange 18 and rear flange 20 and of the web 14 are determined based on the vehicle to which the bumper will be attached and safety standards enforced by governmental and private agencies. Each specific embodiment of the current invention is designed using computer automated engineering, the procedure of which is described in Example B.

Figure 3:
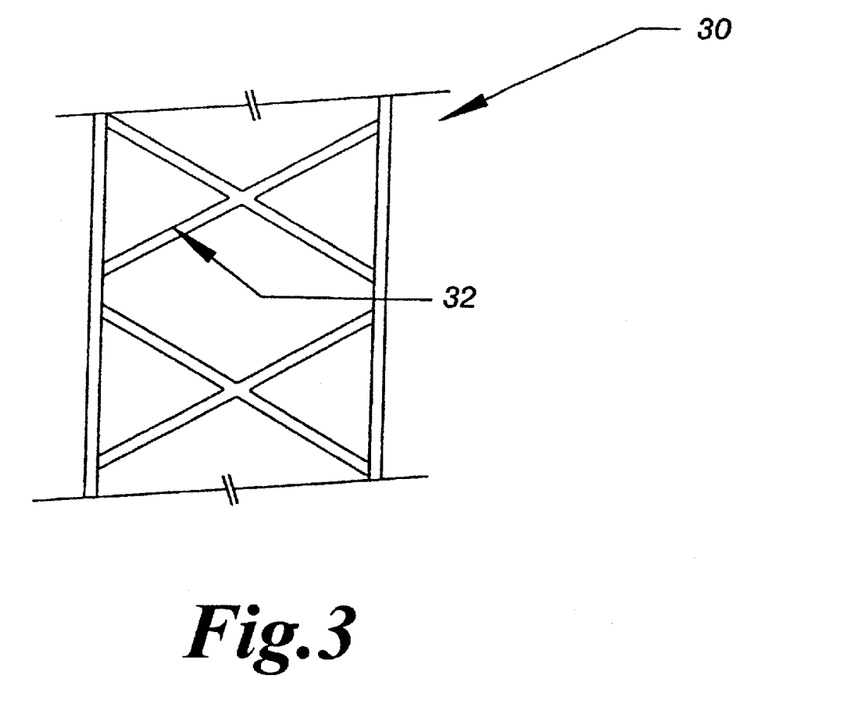
FIG. 3 is a top view of the reinforced I-beam portion of the invented bumper showing reinforcing ribs for torsional stiffening.
Figure 4:
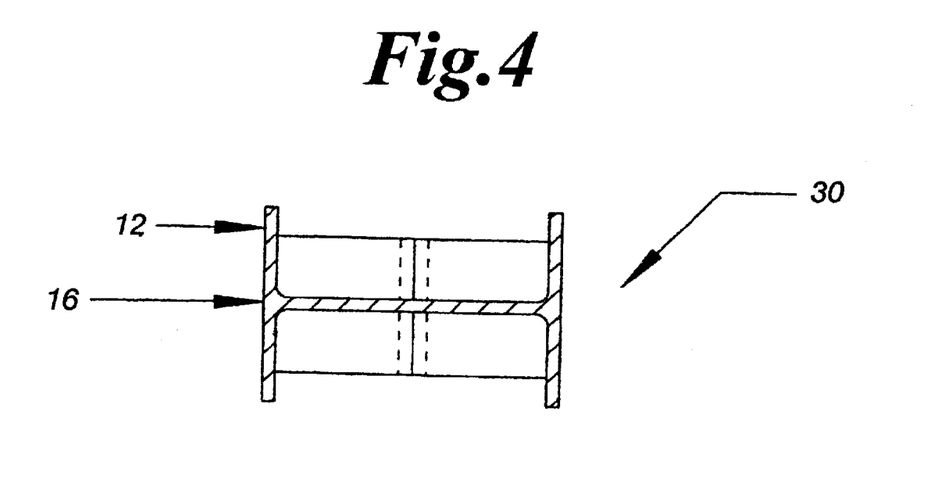
FIG. 4 is a cross sectional view of the reinforced I-beam portion of the invented bumper.

FIG. 3 is a top view of a reinforced I-beam portion 30 of the invented bumper showing reinforcing ribs for torsional stiffening. FIG. 4 is a cross sectional view of the invented reinforced I-beam portion 30 of the invented bumper. These stiffeners 32 distribute the impact loading when the bumper is struck off-center. Stiffeners are a requirement if the bumper is required to pass the Federal and insurance mandates.

Figure 5:
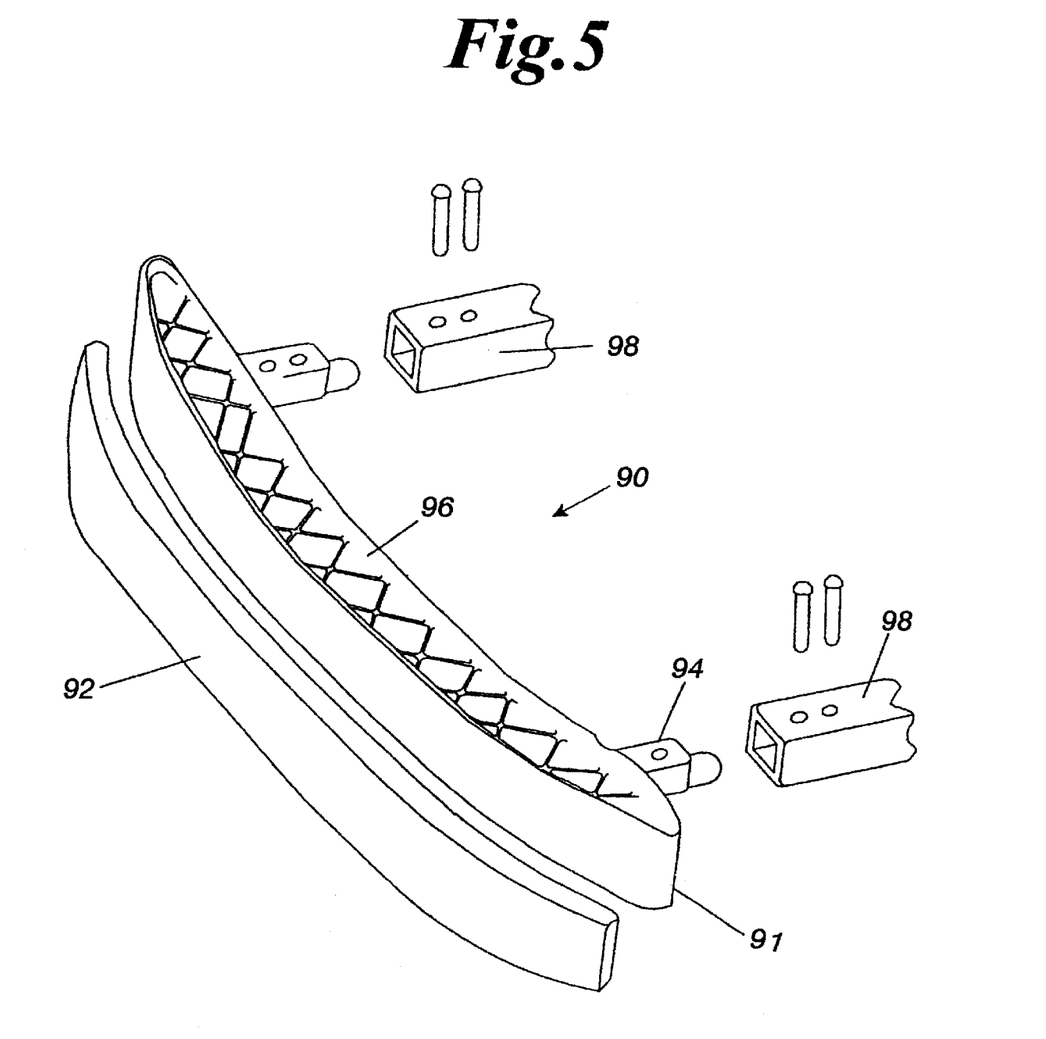
FIG. 5 is a perspective view of an I-beam bumper according to a preferred embodiment of this invention showing brackets to which the invention can be mounted.

Referring to FIG. 5, FIG. 5 is a perspective view of an I-beam bumper 91 according to a preferred embodiment of this invention showing brackets to which the invention can be mounted. A bumper assembly 90 according to this invention is shown in perspective. The receiving hardware of the automobile consists of box-cross section receivers 98. Integral mounting stays 94 are molded into the I-beam 91, eliminating the attachment of hardware for this purpose in a secondary operation. Torsional stiffening ribs 96 provide the needed rigidity for off-center impacts. An energy absorber 92, such as a 45-g/l expanded polypropylene (EPP) foam energy absorber, is shown out of contact with the I-beam 91 for clarity.

Figure 6:
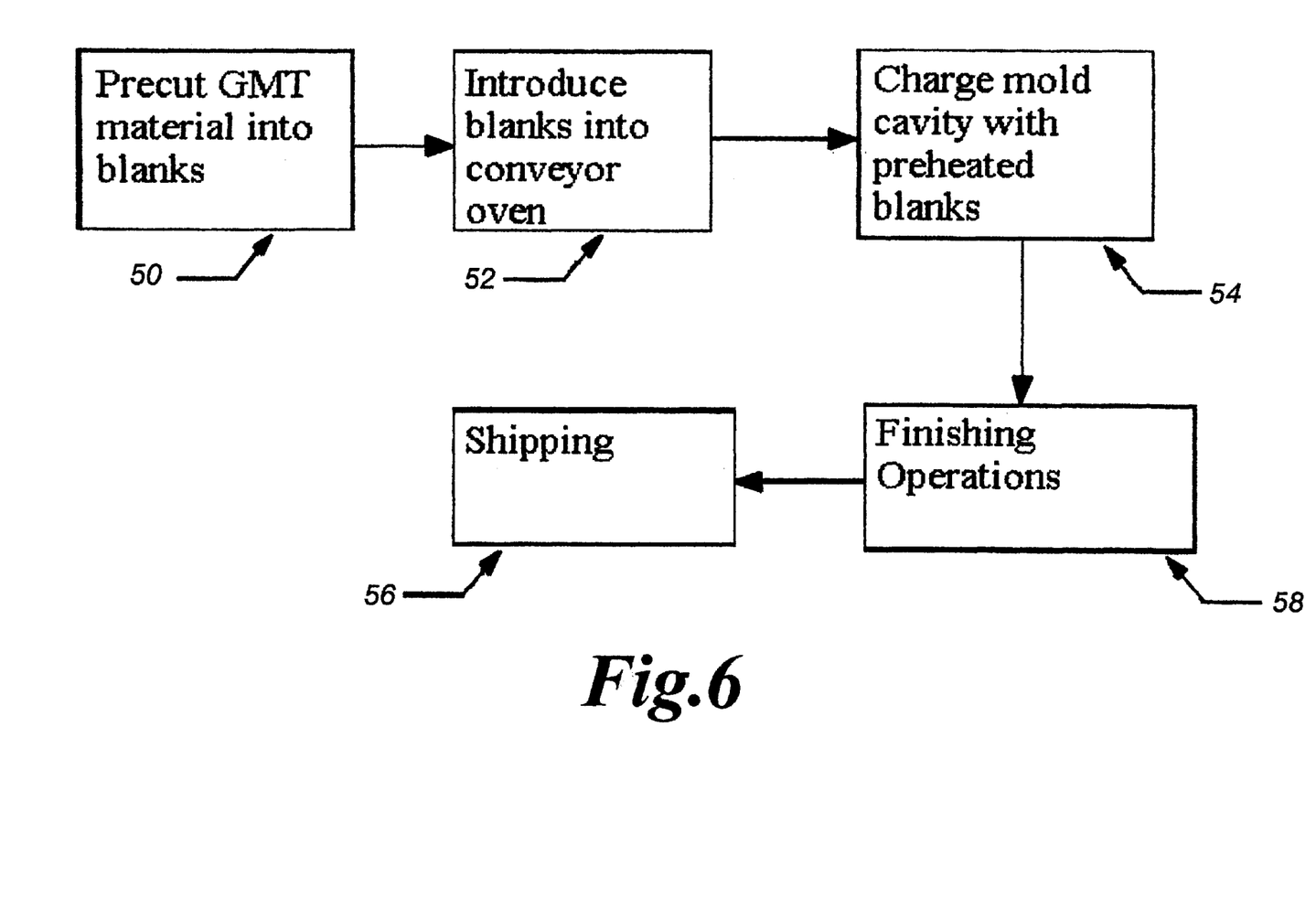
FIG. 6 is a flowchart of a method for forming the invented bumper.

FIG. 6 is a flowchart of a method for forming the invented bumper. Manufacturing of the I-beam bumpers using the above described materials proceeds as follows and as shown in FIG. 6. Precut GMT blanks are manufactured 50 conforming to a desired volume of the I-beam. The blanks are introduced to a conveyor oven 52 that is proximate to and in line with a press. The blanks may be loaded into the oven through manual or automatic loading techniques. The residence time and temperature of the oven are sequenced to the compression molding press to assure appropriate preheat temperatures and continuous operation of the press. Preheated blanks will typically be heated to approximately 225° C., depending on the specific composition of the blanks. The mold cavity is then charged 54 with the blanks. The mold is water cooled. With the materials used according to this invention, the blanks can be rolled into logs to facilitate continuous press charging thereby minimizing operator intervention and resulting in superior end-product uniformity. The mold is closed and the pressure increased with a dwell time of 30 to 60 seconds. The pressed blank is then quenched and finished 58.

With the materials and design used according to this invention, the composite material flows much better into all areas of the mold. As a result, costly finishing operations are minimized. The bumper can be essentially a monolithic piece with no separate mounting of stays or other hardware. I-section beam assembly and finishing operations (such as drilling, deflashing) can be combined into one secondary operation. The result of this manufacturing process is a complete subassembly with energy absorber and mounting hardware that is ready for vehicle installation. This results in a major cost advantage over previous materials and designs. The produced bumper is then shipped 56 to vehicle assembly.

The invented bumper provides dimensional stability. The highly stable combination of the invented I-section beam design along with chopped fiber glass GMT allows for compliance with tight tolerances. Listed below are some examples of tolerances recorded with production I-Section beams.

Cross-Car tolerance between mounting holes±1.0 mm

Profile tolerance±1.5mm

Thickness tolerance±1.5 mm

EXAMPLE A

Bumper beams were tested using a Pendulum Bumper Test. Two test configurations were used, FMVSS Barrier and Pole. Data was accumulated for 4 beams each of 6 different materials.

TABLE 1

Data from Internal Lab Pendulum Tester

| Material | Pendulum Mass (kg) | Barrier Peak Force (N) | Intrusion (mm) | Break yes/no |
|---|---|---|---|---|
| 40% GMT (A) | 1,205 | 76,950 | 60 | NO |
| 40% LF GMT | 1,205 | 80,509 | 58 | NO |
| 40% GMT (B) | 1,205 | 77,395 | 57 | NO |
| 40% LF Modified GMT | 1,205 | 80,509 | 56 | NO |
| 46% Mineral Filled GMT [Y] | 1,205 | 81,398 | 54 | NO |
| 45% Mineral Filled GMT [X] | 1,205 | 80,954 | 54 | NO |

TABLE 1-continued

Data from Internal Lab Pendulum Tester

| Material | Pendulum Mass kg | Pole Peak Force (N) | Intrusion (mm) | Comments |
|---|---|---|---|---|
| 40% GMT (A) | 1500 | 65830 | 96 | beams broke in Pole impact |
| 40% LF GMT | 1500 | 67610 | 92 | beams broke in Pole impact |
| 40% GMT (B) | 1500 | 68054 | 95 | beams broke in Pole impact |
| 40% LF Modified GMT | 1500 | 69389 | 88 | beams broke in Pole impact |
| 46% Mineral Filled GMT [Y] | 1500 | 69389 | 88 | little medium |
| 45% Mineral Filled GMT [X] | 1500 | 70278 | 85 | little/no damage |

All the products tested yielded good results in the Barrier loads, with no beam breakage. The GMT (A & B) materials were standard, commercially available products from two different manufacturers. Their performance was acceptable and was used as the "control" group for experimental analyses. Improved formulations, 40% LF GMT products, were tested, but showed only marginal improvements over the "control" groups. The 45–46% Mineral Filled GMT experiments demonstrated the highest Barrier and Pole Peak Loads and lowest intrusion. Only the mineral filled GMT formulations produced a beam that had little or no breaks in the Pole test. The combination of long fiber glass and small, plate-like mineral particles easily flow into all the areas of the I-Section bumper beams. This homogeneous composition is able to optimize the strength of the highly ribbed design, which enables the ribs to channel the impact energy more efficiently throughout the beam structure.

EXAMPLE B

The design and manufacturing process proceeds through three stages of computer-aided engineering (CAE) and finishes with prototype tooling and parts for physical testing. The CAE process includes computer simulation of the response to the Federal Motor Vehicle Safety Standard 581 and the Insurance Institute for Highway safety 8.0 kph Rear Pole Impact requirements. The simulation results correlate well with the physical testing discussed in Example A hereinabove.

Figure 7:
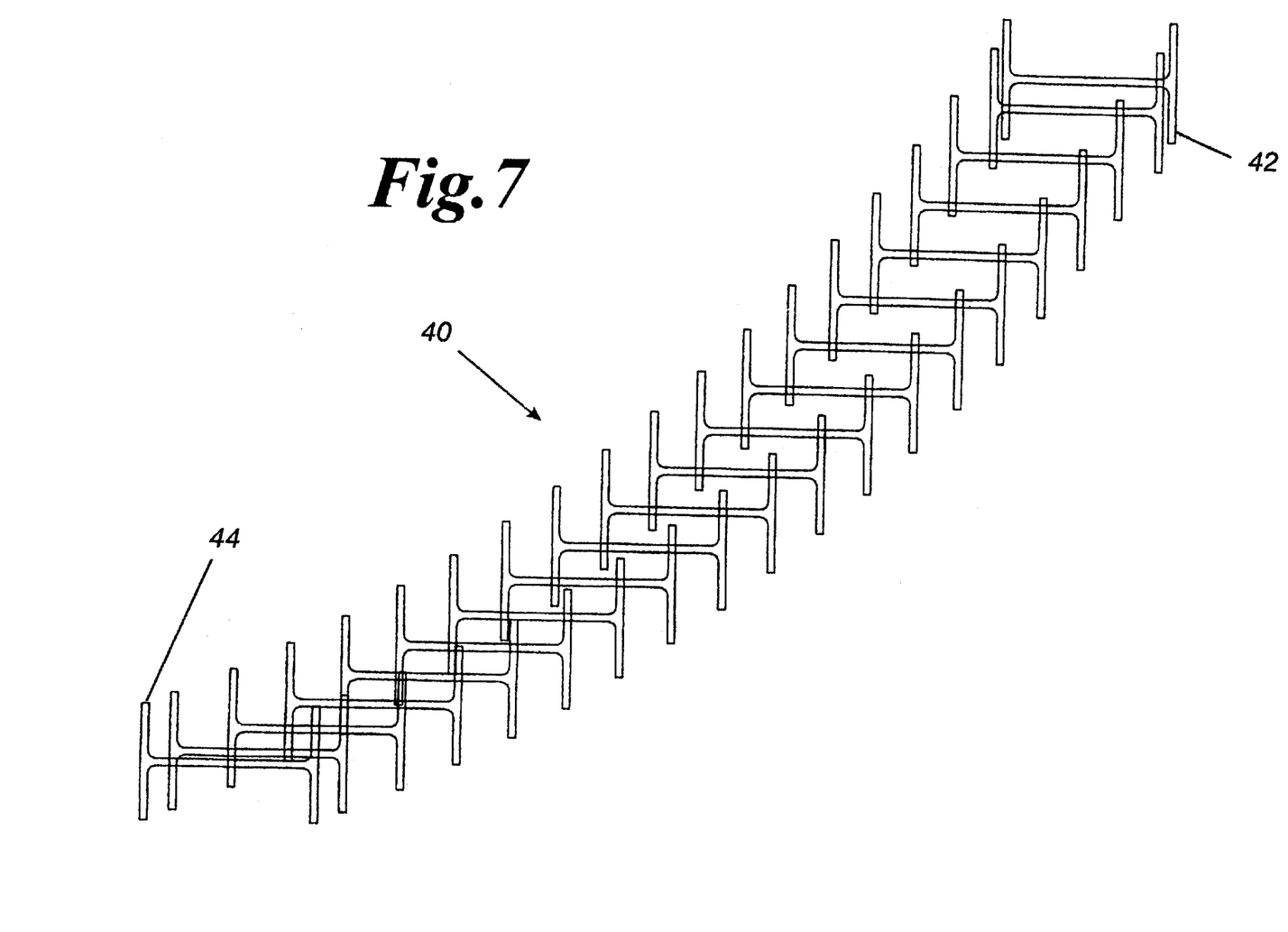
FIG. 7 shows the beam sections whose dimensions are determined using the CAE protocol of this invention.

Referring to FIG. 7, FIG. 7 shows the beam sections whose dimensions are determined using the CAE protocol of this invention. The first phase of the CAE process is to enter the known parameters of the design, such as vehicle dimensions, weight and so forth. The starting point is a computer representation of twenty I-beam segments 40. The sections are modeled from the centerline of the bumper 42 to the rail support 44. The sizes for the sections vary uniformly from the centerline to the rail support 44.

Figure 8:
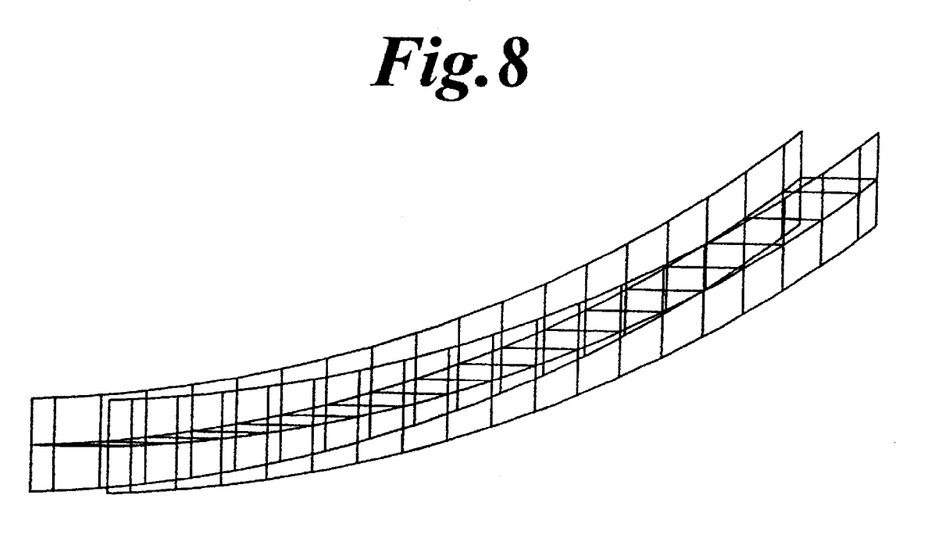
FIG. 8 shows the midplane geometry model determined using the CAE protocol of this invention.
Figure 9:
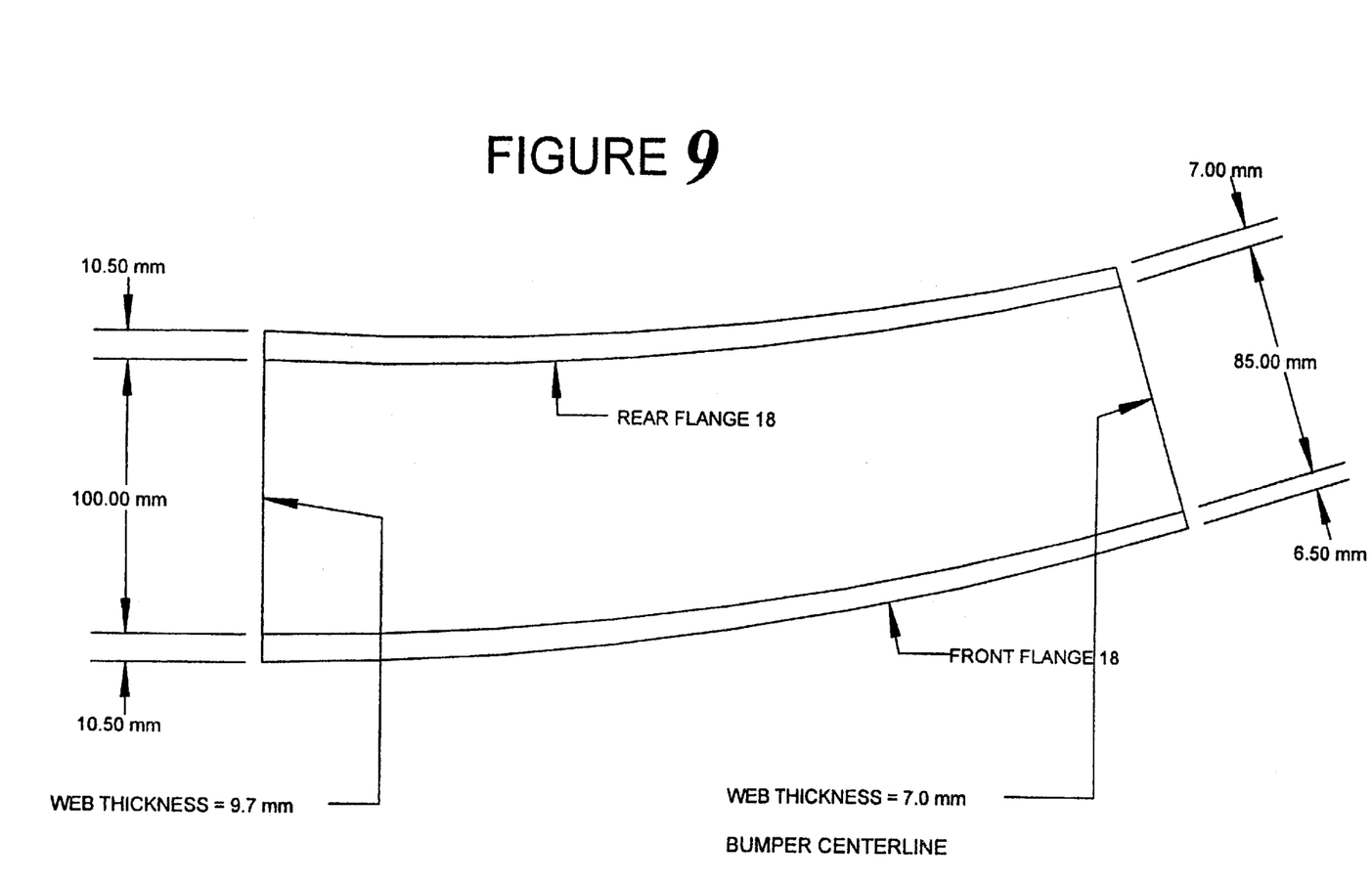
FIG. 9 illustrates a thickness profile for a specific design using the CAE protocol of this invenltion.

Four variables are optimized against barrier impact criterion: the front flange thickness, the web length, the web thickness and the rear flange thickness. Each variable has a different value at each section. FIGS. 8 and 9 illustrate the output of this phase of the CAE process. FIG. 8 shows the midplane geometry model determined using the CAE protocol of this invention and shows a wire frame representation of the centerlines of each section. Each section is unique since the centerlines depend on the four variables. FIG. 9 illustrates a thickness profile for a specific design using the CAE protocol of this invention. FIG. 9 shows a solution for a particular automobile. In tabular form:

|  | Front flange (mm) | Web length (mm) | Web thickness (mm) | Rear flange (mm) |
|---|---|---|---|---|
| Centerline | 6.50 | 85.00 | 7.00 | 7.00 |
| Rail support | 10.50 | 100.00 | 9.70 | 10.50 |

The initial data for the structure include the Federal government and the Insurance Institute test standards, the mass of the vehicle, the span between the bumper mounts (rail span), the package space, the desired system stroke and other pertinent information. An allowance for the vehicles suspension may also be incorporated into the CAE process. The mechanical properties of the energy-absorbing material are known, the depth and mass of the 45-g/l expanded polypropylene foam energy absorber (EA) 92 are outputs of the CAE process. The initial design phase addresses barrier impacts to the bumper. The program uses a heuristic rule to determine the shape of the bumper in 3-D space. The first parameter to determine is the energy involved in a bumper impact and how that energy is dissipated. The overall energy generated is represented by:

$$E = \frac{mv^2}{2} \quad [1]$$

where
E is the energy (in joules),
m is the mass (in kilograms),
v is the velocity (in meters per second).
The units given assume SI units are used.

In a barrier impact, the I-beam and the EA are required to absorb most of the energy. The beam and the EA absorb 85% of the energy with the remainder of the energy being dissipated by the frame of the vehicle. Since the energy is equal to the area under the force versus deflection curve, the energy can be used to determine the load on the bumper and the EA. The load can then be used to determine the corresponding deflection of the bumper and the EA.

For any beam having a longitudinal plane of symmetry and subject to a bending moment M at a certain cross, the normal stress acting on a longitudinal fiber at a distance Y from the neutral axis of the beam is:

$$\sigma = \frac{M \times Y}{I} \quad [2]$$

Where
$\sigma$ is the stress (Newtons per meter$^2$),
M is the bending moment (Newton-meters),
Y is the distance from the neutral axis (meters), and
I is the moment of inertia of the cross section of the element (meters$^4$).

At the outer fibers of the beam the value of the coordinate Y is denoted by c and the maximum normal stresses are:

$$\sigma = \frac{M \times c}{I} = \frac{M}{I/c} \quad [3]$$

The maximum bending stress is represented by defining the variable Z (meters$^3$).

$$\sigma_{max} = \frac{M}{Z} \quad [4]$$

In twenty sections over the center of the bumper to one bumper mount, the front and rear flange dimensions, the web dimension and the web thickness can be uniformly varied. The heuristic method compares the minimum value of Z required to meet the conditions with the calculated value. The design parameters are iterated until each section conforms to the barrier impact criterion. The output consists of thickness profile data for the front and rear flanges and the web as well as web depth.

The midplane geometry and the thickness profiles are downloaded into a Finite Element Analysis Program (FEA) as initial conditions. Since these initial conditions are close to a solution, the computation intensive FEA Program has very few iterations and runs quickly and inexpensively. Using this CAE tool, the torsional properties of the design can be incorporated leading to the place and size of the required tortional stiffeners 32. The performance of the design under the high and low impacts required under the aforementioned Federal and insurance standards can be evaluated and the device fine tuned heuristically to satisfy these requirements. After satisfying these constraints, the FEA model is surfaced and can be used as input for prototype tooling which is the third and final CAE step.

A shell element FE model of the I-beam is generated using the mid-plane and thickness profile output from the first stage and supplemental CAD data for mounting scheme and end finishing. The FE model for low speed impacts includes the energy absorber, the significant body structure attaching to and surrounding the I-beam, and appropriate input energy and boundary conditions. All materials are characterized using full linear and nonlinear material properties. Modeling of the vehicle suspension for low speed impacts is not required for good correlation between physical testing and FE analysis (suspension data is usually not available at the development phase). When the vehicle suspension is not present, the low pendulum impacts are influenced the most; the high pendulum to a lesser degree. This is due to vertical suspension effects, and most data acquisition systems do not measure the vertical component of force. The result, for low pendulum impacts, is a truncation of the Force vs. Intrusion curves, which tend to lengthen as the suspension compresses and the vehicle attitude changes. All impact analyses are performed using LS-DYNA3D®. Measurables include impactor intrusion, I-beam stroke, I-beam stress/strain, body structure stress/strain, energy absorber performance, system deformation mode, and system reaction force. The results of the model prediction and the actual results showed a high degree of correlation.

SUMMARY OF THE ACHIEVEMENT OF THE OBJECTS OF THE INVENTION

From the foregoing it is clear that we have invented an I-section bumper for automobiles that is formed from plastic material. The present invention provides an improved GMT bumper for automobiles that satisfies all relevant requirements for structural integrity under standardized impact test, while significantly reducing manufacturing cost and part weight. The present invention provides a GMT bumper for automobiles that has favorable flow characteristics during compression molding of the bumper.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A fiber reinforced thermoplastic automotive bumper, comprising:

a front portion;

a rear portion; and, at least one cross-member; wherein, said front portion, said rear portion, and said at least one cross-member are molded from a fiber reinforced thermoplastic material having mineral fillers.

2. A fiber reinforced thermoplastic automotive bumper as in claim 1, wherein said fiber reinforced thermoplastic material is a long, chopped structural glass mat thermoplastic composite.

3. A fiber reinforced thermoplastic automotive bumper as in claim 2, wherein said mineral fillers are selected from the group consisting of mica, talc, clay, kaolin, calcium carbonate, $TiO_2$, fummed & ppt silica, plastic fiber & spheres, ppt calcium carbonate, rice hulls and nut shells.

4. A fiber reinforced thermoplastic automotive bumper as in claim 3, wherein said front portion is a substantially flat front flange;

said at least one cross-member is a substantially flat web having a first edge and an opposing second edge, said web oriented perpendicular to said front flange such that said first edge of said web is connected to said front flange along the midline of the flat surface of said front flange; and, said rear portion is a substantially flat rear flange oriented parallel to said front flange, such that said second edge of said web is connected along the midline of the flat surface of said rear flange.

5. An automotive bumper as in claim 4, further comprising:

at least one tortional stiffener connecting said front flange to said rear flange.

6. An automotive bumper as in claim 5, further comprising:

integral mounting hardware molded directly into said bumper, said hardware selected from the group consisting of pencil braces, fascia supports, mounting holes, and mounting stays.

* * * * *